United States Patent [19]
Walker et al.

[11] Patent Number: 6,131,086
[45] Date of Patent: Oct. 10, 2000

[54] METHOD AND SYSTEM FOR ALLOWING VIEWERS TO PURCHASE PROGRAM PRODUCTS

[75] Inventors: Jay S. Walker, Ridgefield; James A. Jorasch, Stamford; Sanjay K. Jindal, Wilton; Thomas M. Sparico, Riverside, all of Conn.

[73] Assignee: Walker Digital, LLC, Stamford, Conn.

[21] Appl. No.: 08/831,968

[22] Filed: Apr. 2, 1997

[51] Int. Cl.$^7$ ..................................................... G06F 19/00
[52] U.S. Cl. ............................... 705/26; 345/327; 705/27
[58] Field of Search ....................... 705/26, 327; 345/327

[56] References Cited

U.S. PATENT DOCUMENTS

| | | |
|---|---|---|
| 4,734,764 | 3/1988 | Pocock et al. . |
| 4,876,592 | 10/1989 | Von Kohorn . |
| 5,057,915 | 10/1991 | Von Kohorn . |
| 5,189,630 | 2/1993 | Barstow et al. . |
| 5,220,420 | 6/1993 | Hoarty et al. . |
| 5,438,355 | 8/1995 | Palmer . |
| 5,469,206 | 11/1995 | Strubbe et al. . |
| 5,475,585 | 4/1998 | Bush . |
| 5,485,221 | 1/1996 | Banker et al. . |
| 5,539,450 | 7/1996 | Handelman . |
| 5,553,221 | 9/1996 | Reimer et al. . |
| 5,559,949 | 9/1996 | Reimer et al. . |
| 5,564,001 | 10/1996 | Lewis . |
| 5,570,295 | 10/1996 | Isenberg et al. . |
| 5,596,705 | 1/1997 | Reimer et al. . |
| 5,703,795 | 12/1997 | Mankovitz ............................... 345/327 |
| 5,715,400 | 2/1998 | Reimer et al. ............................ 705/26 |

OTHER PUBLICATIONS

Paul Andrews, Paul Allen's Ticket To the Future, The Seattle Times, Nov. 23, 1993 at E1.

Stratford Sherman, Will the Information Superhighway be the Death of Retailing?, Fortune Magazine, Apr. 18, 1994 at 98.

Kelly, Katy, "Programming the Profits at QVC," *USA Today*, Jun. 10, 1993, p. 3D.

"Interactive Multimedia Network: 21st century marketing strategy propels clients to higher profits." M2 Presswire, Apr. 9, 1996.

The Cincinnati Enquirer, Mar. 25, 1996, p. C06.

Hopkins, T., "Cincinnatians Devise Home–Shopping Sitcom," *The Dayton Daily News*, Mar. 6, 1995, p. 10B.

*The Boston Herald*, Mar. 2, 1995, p. 047.

"Sound Bites," *The News Tribune*, Mar. 2, 1995, p. SL2.

Rivers, Joan, "Can we hawk? a work in progress, "Can We Shop" wants to define new paradigms for TV advertising; teleshopping," *Inside Media*, Mar. 16, 1994, p. 1.

White, Todd, "This guy is really connected; IDB Communications' Jeffrey Sudikoff links farflung sites via satellites, fiber–optic cables," *The Los Angeles Business Journal*, Jan. 25, 1993, sec. 1, p. 16.

*Primary Examiner*—Allen R. MacDonald
*Assistant Examiner*—Penny Caudle
*Attorney, Agent, or Firm*—Jeffrey L. Brandt

[57] ABSTRACT

To allow viewers to easily purchase products shown in entertainment programs, the viewers call an operator terminal. The operator terminal is networked to a central controller, which is also networked to remote terminals. Remote terminal operators enter data about props used in programs, copies of which are to be offered for sale. These remote terminals transmit this data to the central controller for storage in a database. Operators at the operator terminals can access the data stored at the central controller to respond calls from viewers seeking to purchase products.

54 Claims, 12 Drawing Sheets

| PROGRAM RECORD NUMBER 510 | NETWORK 515 | CLASS 520 | PROGRAM TITLE 525 | EPISODE DATE AND TIME 530 | SCENE DATA 535 | EPISODE STATUS 540 | EPISODE TITLE 545 | EPISODE PLOT 550 | SPECIAL CHARACTERS 555 |
|---|---|---|---|---|---|---|---|---|---|
| JS-112 | NBC | SITCOM | SEINFELD | 12/12/96 9:00 PM | JERRY EATING CEREAL | FIRST RUN | THE ROBBERY | JERRY'S APT. IS ROBBED | THIEF |
| JS-113 | NBC | SITCOM | SEINFELD | 12/19/96 9:00 PM | GEORGE KICKS TIRE | FIRST RUN | THE PARKING SPACE | GEORGE IN PARKING LOT | MIKE |
| SOYR-234 | CBS | SOAP OPERA | GENERAL HOSPITAL | 10/10/96 12:00 PM | LAURA WALKING DOWN THE ISLE | FIRST RUN | LUKE AND LAURA WED | LUKE AND LAURA GET MARRIED | GOV'T SPY |
| PGA-43X | ABC | SPORTS | PGA CHAMPIONSHIP | 11/11/96 3:00 PM | WOODS IN THE BUNKER | RERUN | MASTERS | 1ST-WOODS 2ND-NORMAN 3RD-PALMER | ANNOUNCER BOB COSTAS |

| PROGRAM RECORD NUMBER 610 | PROP TYPE 615 | PROGRAM IDENTIFYING DATA 620 | PROP IDENTIFYING DATA 625 | PRODUCT DESCRIPTION 630 | VENDOR 635 | PRODUCT COST 640 | AVAILABILITY 645 | TIME CODE 650 |
|---|---|---|---|---|---|---|---|---|
| JS-112 | CLOTHING | JERRY SPILLED COFFEE ON IT | KRAMER'S DARK BLUE SUIT | DOUBLE BREASTED PIN STRIPE | ARMANI | $800 PER SUIT | UNLIMITED | 8:37 TO 8:39 |
| SOYR-234 | FURNITURE | LEAD CHARACTER FELL OVER THIS COUCH | BLACK COUCH IN HOTEL ROOM | 5 FT. BLACK LEATHER LOVE SEAT | HUFFMAN KOOS | $12,000 PER UNIT | 300 | 9:12 TO 9:16 |
| PGA-43X | SPORTING GOODS | TIGER WOODS TOOK FIRST | CLUB THAT WOODS TOSSED IN THE AIR | BIG BERTHA 1 WOOD DRIVER | CALLOWAY | $250 PER CLUB | UNLIMITED | 10:05 TO 10:06 & 10:08 TO 10:12 |

| VENDOR 710 | VENDOR IDENTIFICATION NUMBER 715 | PRODUCTS 720 | LOCATION 725 | PREFERRED PAYMENT 730 |
|---|---|---|---|---|
| CALLOWAY, INC. | SALESMAN A | BIG BERTHA GOLF CLUBS | LOS ANGELES, CA | VISA / MC |
| HUFFMAN KOOS | SALESMAN B | FURNITURE | REGIONAL | AMERICAN EXPRESS |
| BROOKS BROTHERS | SALESMAN C | CLOTHING | NEW YORK, NY | DISCOVER / AMEX |

| VIEWER NAME 810 | VIEWER ADDRESS 815 | ORDER TRACKING NUMBER 820 | ORDER DATE 825 | ORDER AMOUNT 830 | PRODUCT ORDERED 835 | PRODUCT ID NUMBER 840 | PAYMENT DATA 845 | SHIPPING DATA 850 | VENDOR USED 855 |
|---|---|---|---|---|---|---|---|---|---|
| CALLER A | 111 ABC ST... | 123A-4X | 12/12/96 | $450.00 | GOLF CLUBS | 423-A | AMEX NO. 123455-76... | OUT: 12/13 REC: 12/23 | CALLOWAY |
| CALLER B | 222 CBA ST... | 133A-4X | 12/12/96 | $59.99 | COUCH | 678-G | VISA / MC NO. 23457... | OUT: 12/13 REC: NO | HUFFMAN KOOS |
| CALLER C | 333 BCA ST... | 134A-5X | 12/13/96 | $1,023.00 | SUIT | 456-V | DISCOVER NO. 3445-67 | OUT: 12/15 REC: NO | BROOKS BROTHERS |

METHOD AND SYSTEM FOR ALLOWING VIEWERS TO PURCHASE PROGRAM PRODUCTS

BACKGROUND OF THE INVENTION

1. Field of the Invention

The present invention relates to a method and system for allowing viewers to purchase products shown on television shows. More particularly, the invention relates to a method and system for allowing television viewers to purchase products which appear on entertainment program-type television shows.

2. Description of the Related Art

Television programs dedicated solely to selling merchandise, or sales programs, have been broadcast on television and other broadcast media. One example of such sales programs includes, "infomercials," which are essentially lengthy paid commercials. Also, narrative television programs, in which scenes that showcase products available for sale are intermittently frozen while commercial sales of those products are undertaken, have been broadcast.

In recent years, sales programs have become increasingly commonplace. This is largely attributable to the wide availability of cable television, which provides access to many more channels, and therefore programming choices, than would otherwise be available. Indeed, cable channels such as the "Home Shopping Network," are devoted solely to selling merchandise.

In addition to broadcasted television, promotional video tapes have also been used to specifically sell merchandise. Automobile manufacturers, for example, distribute video tapes containing product information to potential customers.

Sales programs, however, do not constitute the most prevalent type of programming. Far more widespread are programs whose primary objective is to entertain. Entertainment programs, which include such programs as soap operas, sitcoms, dramas, and sporting events, generate revenue primarily by selling advertising time dispersed throughout broadcasts of the programs. Thus, while entertainment programs are supported by advertising, the artistic contents of entertainment programs are directed solely to entertaining viewers, and not to soliciting sales of merchandise as they are with sales programs.

Because entertainment programs are typically not produced with the intent of selling merchandise, a potentially lucrative source of revenue has gone unrealized. Television viewers may find themselves interested in purchasing products which are the same brand or design as props seen in entertainment programs. However, the demand for these products has not yet been satisfied. Revenue from sales of such products could improve the financial success of an entertainment program. Manufacturers would pay to have their products used in popular shows. Further, the producers could charge a fee for each product ordered that was identified from their show. This could increase revenues as well as lessen the program's dependency on advertising. As a result, products could experience greater freedom of artistic content, increasing the variety of entertainment programs available to the public.

Present sales mechanisms are not effective for selling products that are related to entertainment programs. For example, while catalogs are presently used to sell souvenir merchandise such as t-shirts and coffee mugs, they do not sell products similar to television props. For example, a program viewer cannot buy the Armani suit that Frasier was wearing on the Jun. 30, 1996 episode. These products gain much appeal from their association with the program actors. The present invention provides viewers with a sense of immediate gratification through making the products readily available.

SUMMARY OF THE INVENTION

Systems consistent with the present invention allow viewers of an entertainment program to purchase products used in the program. Information about products is stored in databases that can be accessed by operators based on viewer supplied information.

To achieve these and other advantages, a product sales system consistent with the present invention comprises a system for allowing a viewer to purchase products shown in an entertainment program. The system includes means for storing in a database product information relating to a product shown in the entertainment program. Means are provided for receiving from the viewer a request about the product shown in the entertainment program, the request containing a subset of the product information. Also included are means for identifying the product information in the database using the subset of the product information, and means for sending to the viewer the identified information about the product.

In another aspect, the invention includes a system for allowing entertainment program viewers to purchase products shown in an entertainment program. The system includes a remote terminal for entering product data about a product used in the entertainment program. A central controller, coupled to the remote terminal, receives and stores the entered product data from the remote terminal. An operator terminal, coupled to the central controller, accesses from the central controller information about the product used in the entertainment program.

Both the foregoing general description and the following Detailed Description are exemplary and are intended to provide further explanation of the invention as claimed.

BRIEF DESCRIPTION OF THE DRAWINGS

The accompanying drawings provide a further understanding of the invention and, together with the Detailed Description, explain the principles of the invention. In the drawings:

FIG. 5 illustrates sample records from program database 262 stored in data storage device 260 shown in FIG. 2;

FIG. 6 illustrates sample records from product database 263 stored in data storage device 260 shown in FIG. 2;

FIG. 7 illustrates sample records from vendor database 264 stored in data storage device 260 shown in FIG. 2;

FIG. 8 illustrates sample records from order database 265 stored in data storage device 260 shown in FIG. 2;

DETAILED DESCRIPTION

Introduction

Systems consistent with this invention allow viewers of an entertainment program to purchase products seen on these programs. The term "entertainment program," as used in the specification, refers to programs whose primary purpose is to entertain, and not to sell products or services. Examples of "entertainment programs" include soap operas, sitcoms, dramas, sporting events, and movies. An entertainment program may be transmitted over any transmission media, such as wireless transmission, cable, or the Internet, or stored on a storage media, such as video tape or laser disk. Further, an entertainment program may be displayed on any broadcast media, such as television. The term "prop" refers to an item actually used in an entertainment program. The term "product" refers to merchandise similar to the prop. By similar, it is meant that the product is visually and/or functionally indistinguishable from the prop. The product may or may not be the same brand and/or make and model of the prop, but will not be the actual prop used in the show. This includes but is not limited to clothing, furniture, electronic goods, jewelry, cars, sporting goods and the like. The term product is not restricted to physical goods, but also includes services such as vacations or tickets to sporting events or shows. Additionally, videos of the episode would also be available for sale through this service.

In one such system, a central controller stores information about products available for sale. Before an entertainment program is broadcasted, viewers are shown a telephone number that they can call to find out whether certain products used in the program are available for sale. Calling this telephone number connects viewers to an operator who queries them regarding products they are interested in purchasing. The operator then compares the information provided by the viewers with information stored in the central controller's database to identify the particular products each viewer would like to purchase. The database is organized to allow the operator to access information with only a minimal amount of information describing the product. The operator may also provide viewers with information about products other than those the viewers asked about. If the viewers are interested in purchasing a product at this point, an order is placed for the product through the operator.

System Organization

Figure 1:
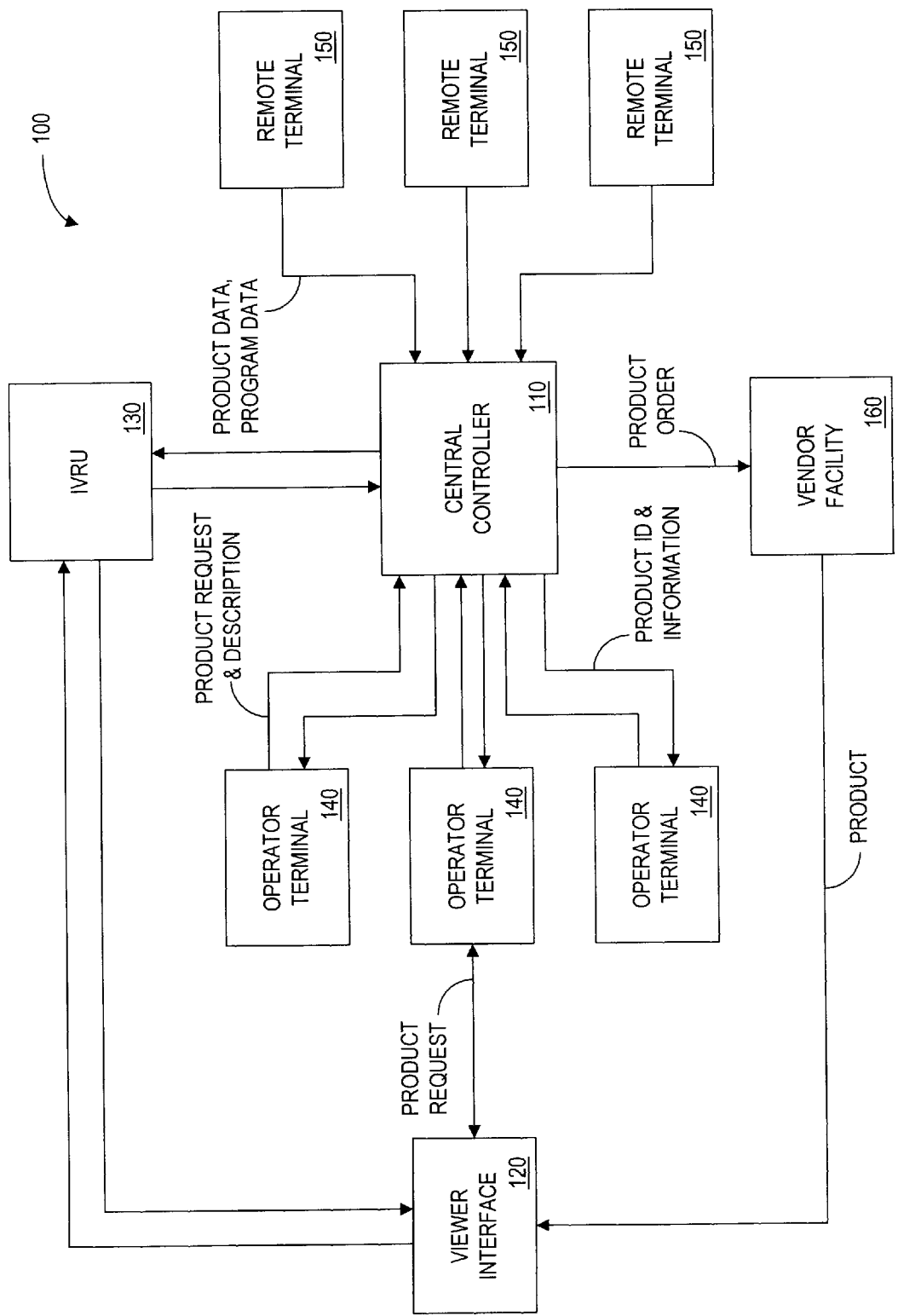
FIG. 1 is a block diagram of the product sales system consistent with the invention.

FIG. 1 illustrates a block diagram of a system 100 consistent with the present invention. System 100 includes a central controller 110, a viewer interface 120, a telephonic interactive voice response unit (IVRU) 130, a plurality of operator terminals 140, a plurality of remote terminals 150, and a vendor facility 160. Although FIG. 1 shows three operator terminals 140 and three remote terminals 150, any number of these terminals may be connected to central controller 110. Similarly, one viewer interface 120 or multiple viewer interfaces 120 can access each operator terminal 140 through a corresponding IVRU 130. Central controller 110 is linked to operator terminals 140, remote terminals 150, and vendor facility 160 through communication links, such as telephone lines or other data communication lines. IVRU 130 is linked to viewer interface 120 by conventional telephone lines.

Central controller 110 receives product data and entertainment program data from remote terminals 150 and stores this data in a memory, as described below. Further, viewer interface 120 transmits a product request to a corresponding IVRU 130 and operator terminal 140, each of which may be located in a call service center. The product request describes a particular product of interest to the viewer, and an operator at operator terminal 140 processes the product request. Terminal 140 then transmits program description data corresponding to the request to central controller 110, which, after accessing the product and program data stored in its memory, transmits product identification data back to operator terminal 140. This data is provided to viewer interface 120. If the viewer decides to purchase a product, controller 110 transmits product order data to vendor facility 160, which then routes the purchased product to the viewer.

Central controller 110 preferably includes a digital data processing unit programmed to execute unique functions and operations in accordance with the principles of the invention. Such a digital data processing unit may include conventional hardware, such as the IBM RS 6000. Operator terminals 140 and remote terminals 150 are digital data processing units, such as conventional personal computers configured to carry out the functions and operations described below.

Viewer interface 120 preferably comprises a conventional touch-tone telephone, although any device capable of transmitting messages may be employed. In one embodiment viewer interface 120 comprises a conventional personal computer with a modem. The user connects to central controller 110 or operator terminal 140 via the Internet or other appropriate data communication channels.

Figure 2:
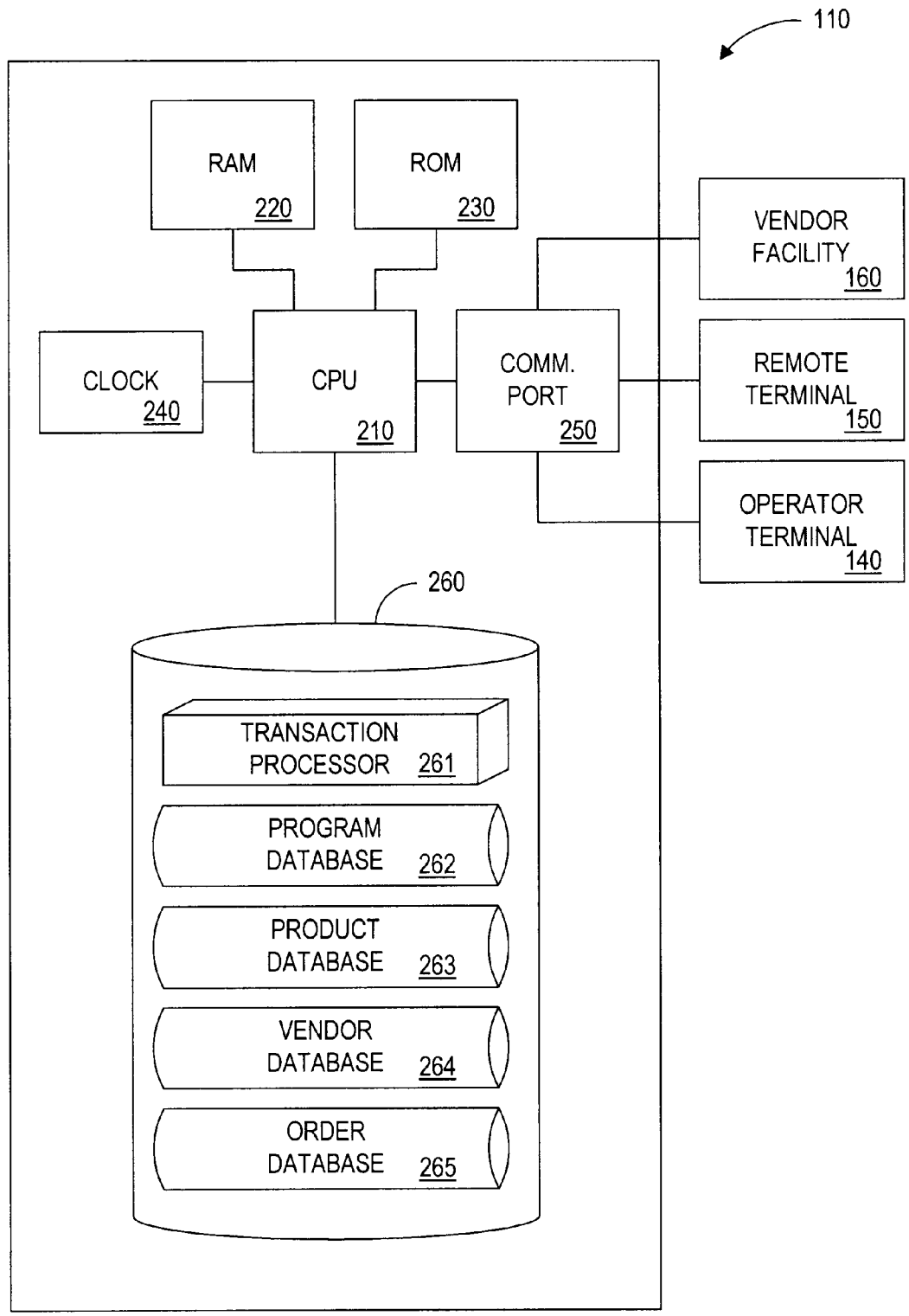
FIG. 2 is a block diagram of central controller 110 shown in FIG. 1.

FIG. 2 is a block diagram showing one embodiment of central controller 110. Central controller 110 includes certain standard hardware components, such as central processing unit (CPU) 210, random access memory (RAM) 220, read only memory (ROM) 230, clock 240, communication port 250, and data storage device 260. CPU 210 is linked to each of the other listed elements. Communication port 250 interfaces central controller 110 with operator terminal 140, remote terminal 150, and vendor facility 160.

Central controller 110 executes one or more programs to perform the functions and operations described below, and stores several databases of data relating to those functions and operations. These databases include program database 262, product database 263, vendor database 264, and order database 265. The programs (described in reference to FIGS. 10 and 11) are preferably stored in storage device 260 and executed by CPU 210. Transaction processor 261 manages the storage and retrieval from the databases in data storage device 260. Transaction processor 261 may comprise a separate conventional microprocessor, as shown in FIG. 2, or may comprise a portion of the operating function of CPU 210.

Program database 262 provides a repository of information on entertainment programs on which products available for sale were used. By accessing the information stored in database 262, operator terminal 140 can identify the particular entertainment program the viewer is calling about. FIG. 5 shows a possible organization of database 262 with the following fields for each program: program record number 510; network 515; class 520; program title 525; episode date and time 530; scene data 535; episode status 540; episode title 545; episode plot 550; and special characters 555. A manager of the system assigns program record number 510, which uniquely identifies a particular entertainment program. In one embodiment, program record number 510 could correspond to a program identifying number used in the VCR Plus system. Scene data field 535 includes information identifying a particular program scene in which a prop was used. A sitcom, for example, might have a scene data record describing the activity of the characters in the kitchen if the prop being sold is a kitchen utensil. The remaining fields are self-explanatory. Episode plot field 550 includes information describing the plot of a particular episode of an entertainment program. Special characters field 555 includes data representing, for example, guest characters or persons appearing in a particular episode. In alternative embodiments, program database 262 includes fewer or more fields of program information.

Product database 263 provides a table of information on products indexed by a program record number 610, which may be the same as program record number 510. By accessing the information in product database 263, operator terminal 140 can identify the particular product that the viewer is interested in purchasing. As shown in FIG. 6, database 263 preferably includes the following fields on each product offered for sale: program record number 610; prop type 615; program identifying data 620; prop identifying data 625; product description 630; vendor 635; product cost 640; availability 645; and time code 650. Program and product identifying fields 620 and 625 include information that enables the identification of programs, and products offered for sale on the programs, respectively. Such information describes characteristics of the entertainment programs and associated products. Thus, program identifying data field 620 typically contains information similar to episode plot field 550. Time code field 650 includes a range of time code values corresponding to the time during which the respective product was displayed on the program. Product database 263 further includes information about the type of product for sale (prop type 615), and retail information about the product description 630, vendor 635, product cost 640, and availability 645. In practice, product database 263 may include fewer or more fields for product information.

Vendor database 264 contains a table of information on the different vendors who supply the products. This table is preferably indexed by various vendor names. The information stored in vendor database 264 reflects information that central controller 110 can access about product vendors when placing orders. In other words, vendor database 264 provides information that may be either provided to viewer interface 120 or used while placing an order with a particular product vendor. FIG. 7 shows a possible organization for vendor information containing the following fields on each registered vendor: vendor name 710; vendor identification number 715; products sold by the vendor 720; location of the vendor 725; and preferred methods of payment 730. The nature of these fields are self-explanatory. In alternative embodiments, vendor database 264 may include more or fewer fields.

Order database 265 includes a data file for each order placed by a viewer. FIG. 8 shows a possible organization of database 265 with the following fields for each viewer: viewer name 810; viewer address 815; order tracking number 820; order date 825; order amount 830; product ordered 835; product identification number 840; method of payment used 845; shipping data 850; and vendor used 855 (same as vendor field 710). Product identification number 840 is preferably assigned by vendor 855. The nature of the remaining fields are self-explanatory. Order database 265 may, however, include fewer or more fields for order information.

Figure 3:
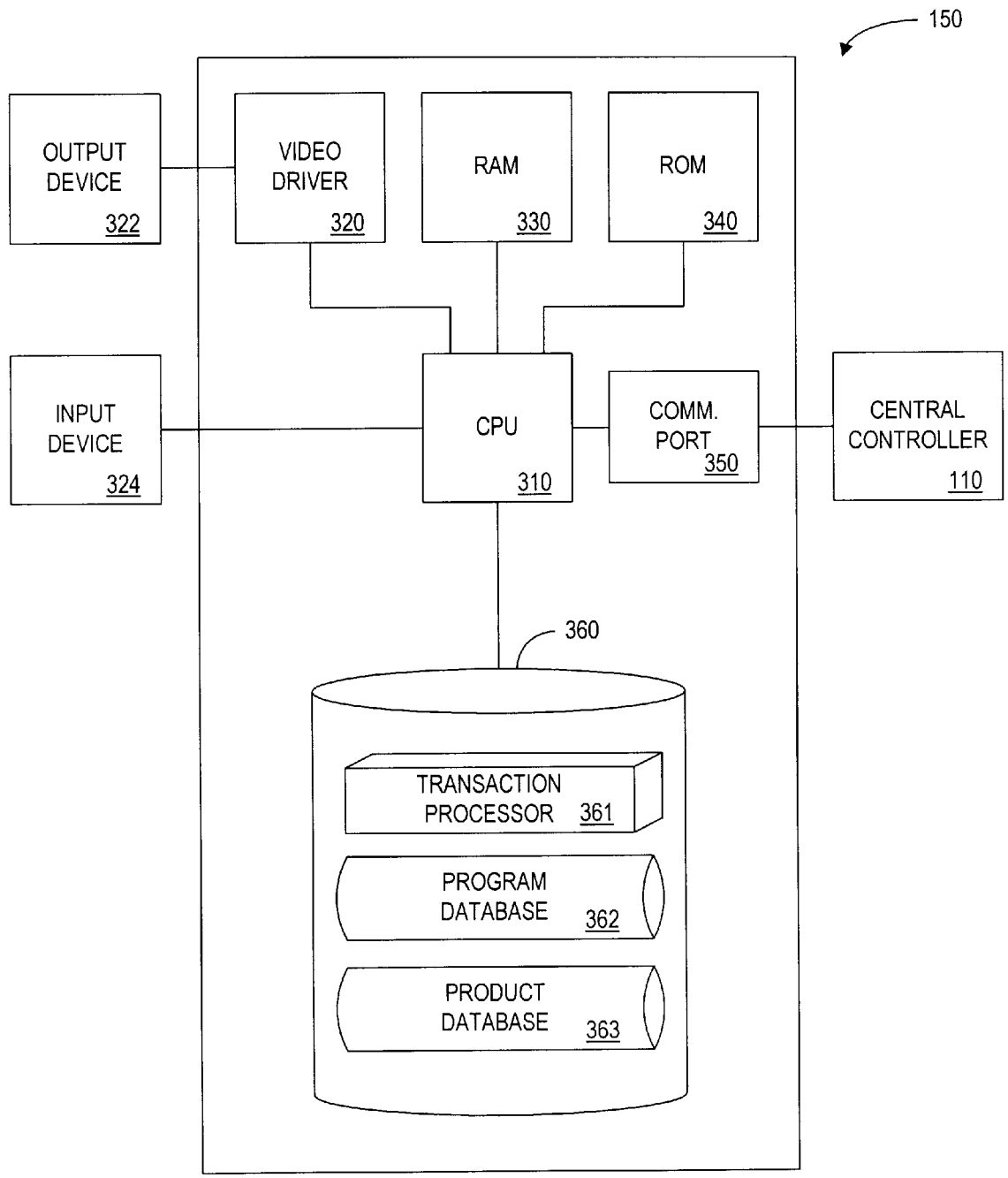
FIG. 3 is a block diagram of remote terminal 150 shown in FIG. 1.

FIG. 3 shows the architecture of remote terminal 150 of system 100. Communication port 350 provides an interface for linking remote terminal 150 to central controller 110. As shown in FIG. 3, remote terminal 150 includes conventional computer components, including CPU 310, which is connected to video driver 320, video terminal 322, data entry unit 324, RAM 330, ROM 340, communication port 350, and data storage device 360. Video terminal 322 is connected to CPU 310 through video driver 320. Data entry unit 324, shown to include a keyboard and a mouse, is connected to CPU 310 for entering data. CPU 310 executes program modules (described in reference to FIG. 9) preferably stored in storage device 360 to perform the functions and operations described below in connection with remote terminal 150. Storage device 360 includes transaction processor 361, program database 362, and product database 363.

With respect to data entry operations, remote terminal 150 operates conventionally. A remote terminal operator enters into remote terminal 110 program data for program database 362 and product data for product database 363. Under control of a program stored, for example, in storage device 360 or ROM 340, CPU 310 formats the data for storage in program database 362 and product database 363. Databases 362 and 363 are similar in organization to program database 262 of FIG. 5 and product database 263 of FIG. 6, except that databases 362 and 363 contain information entered in the remote terminal 150.

Figure 4:
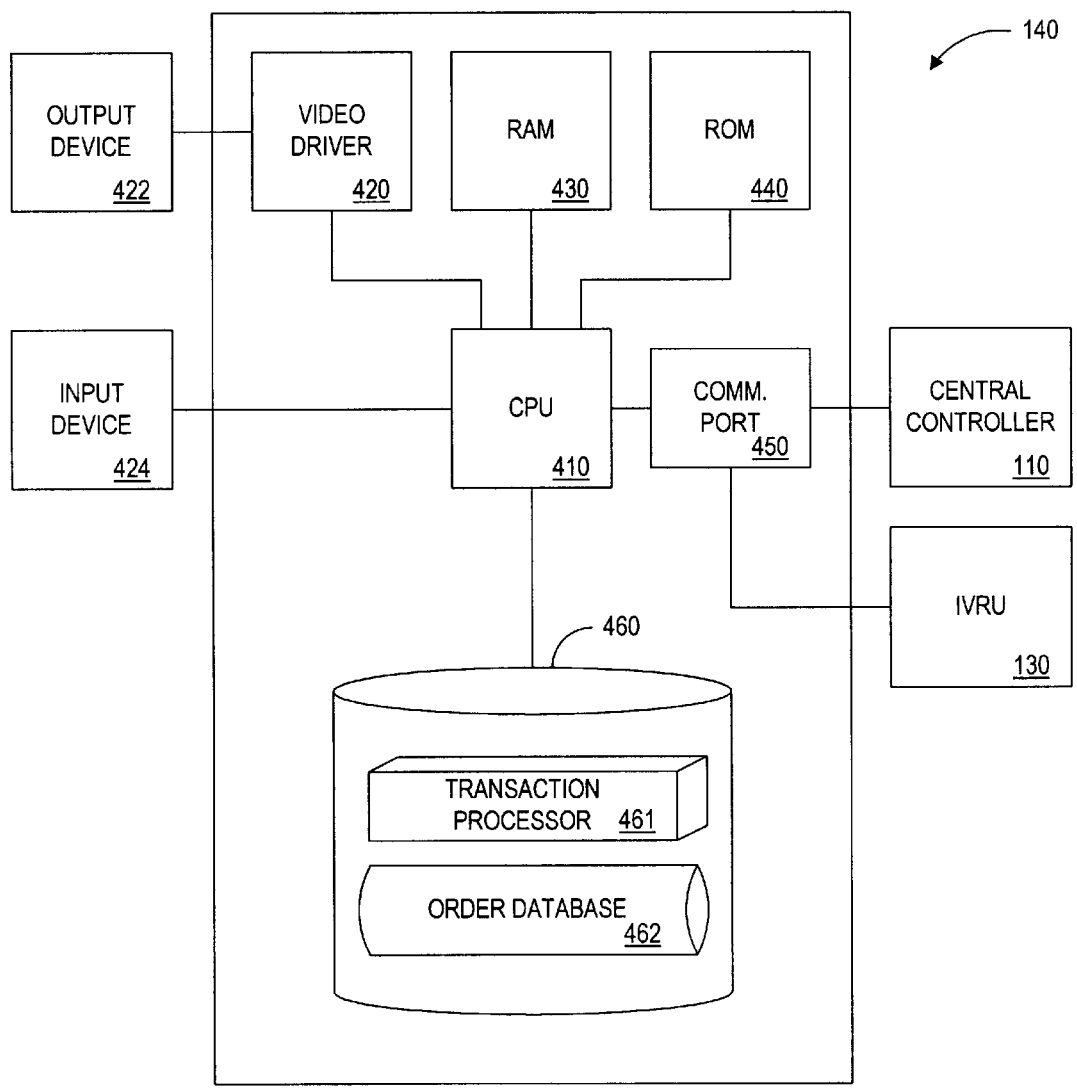
FIG. 4 is a block diagram of operator terminal 140 shown in FIG. 1.

FIG. 4 shows the architecture of operator terminal 140 according to the invention. Communication port 450 provides an interface for linking operator terminal 140 to central controller 110 and IVRU 130. As shown in FIG. 4, operator terminal 140 includes CPU 410 which is connected to video driver 420, video terminal 422, data entry unit 424, RAM 430, ROM 440, and data storage device 460. These components may also be conventional. Video terminal 422 is connected to CPU 410 through video driver 420. Data entry unit 424, shown to include a keyboard and a mouse, is connected to CPU 410 for entering data. CPU 410 executes modules stored in storage device 460 to perform functions and operations described below. Further, storage device 460 includes transaction processor 461 and order database 462. Database 462 comprises a subset of order database 265 of FIG. 8, and includes order information generated locally by operator terminal 140.

System Operation

Two different aspects of the operation of system 100 will be described. First, system 100 operates to create the databases for the sale of products. Second, system 100 operates using the databases to enable viewers to purchase products shown on an entertainment program.

Creating the Databases

Figure 9:
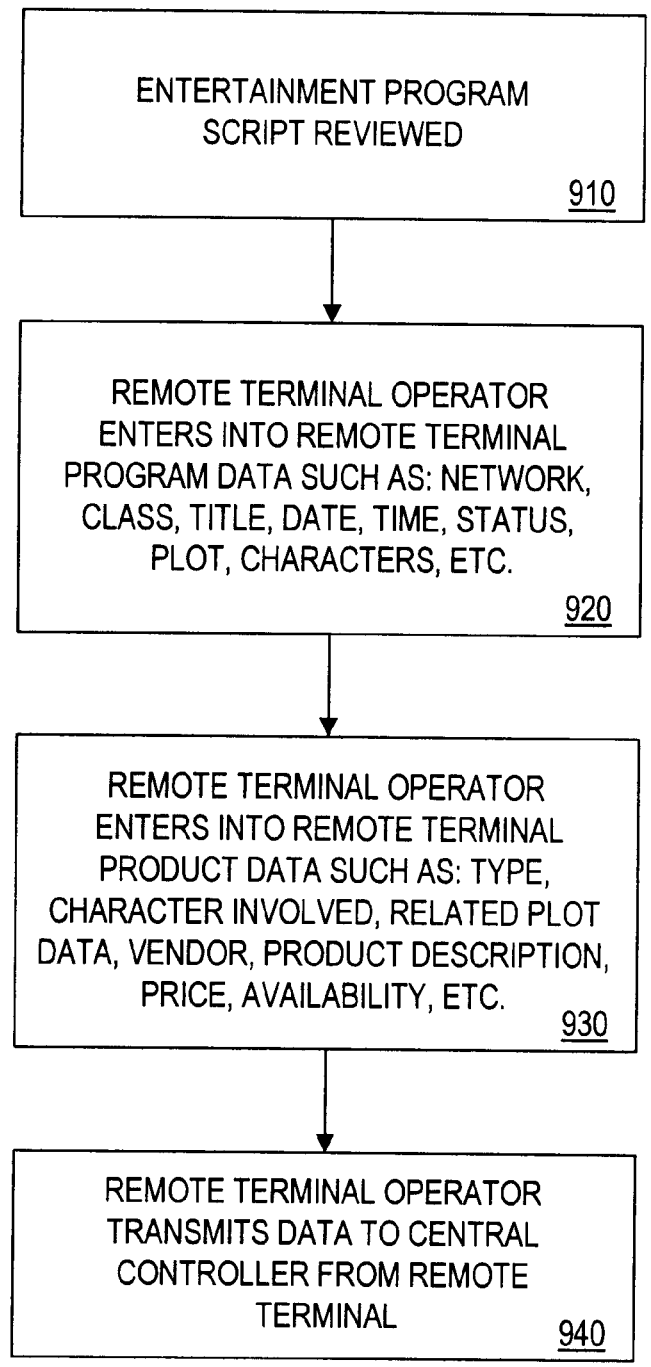
FIG. 9 is a flow diagram representing a method for the operation of remote terminal 150 shown in FIG. 3.

FIG. 9 is a flowchart illustrating steps for entering program and product information into system 100. This data entry may be performed during or after the filming or taping of an entertainment program. As shown in FIG. 9, a remote terminal operator reviews the script of the entertainment program to determine which products will be offered for sale (step 910). According to one embodiment of the invention, the products sold are not the actual props used on the program, but substantially identical merchandise ordered from the particular product vendor.

In alternative embodiments, the actual props used on an entertainment program are sold to viewers. The actual items used by celebrities often have a significantly higher market value than identical, but new, items. Therefore, the price for the actual prop of an entertainment program may be determined, for example, by an auction among the viewers in which the prop is sold to the highest bidder during a fixed period of time. In an auction, each viewer telephones IVRU 130 to place his bid with an operator. Central controller 110 determines the winner of the auction by ranking the viewer bids.

The remote terminal operator enters program data for storage in local program database 362 of remote terminal 150 (step 920) and product data for storage in local product database 363 of remote terminal 150 (step 930). Examples of types of program data and product data are shown in FIGS. 3 and 4. Remote terminal 150 transmits the data stored in program database 362 and product database 363 to central controller 110 (step 940). This may be done shortly after the remote terminal operator has entered the data or at a specified time interval (e.g., once a week).

Figure 10:
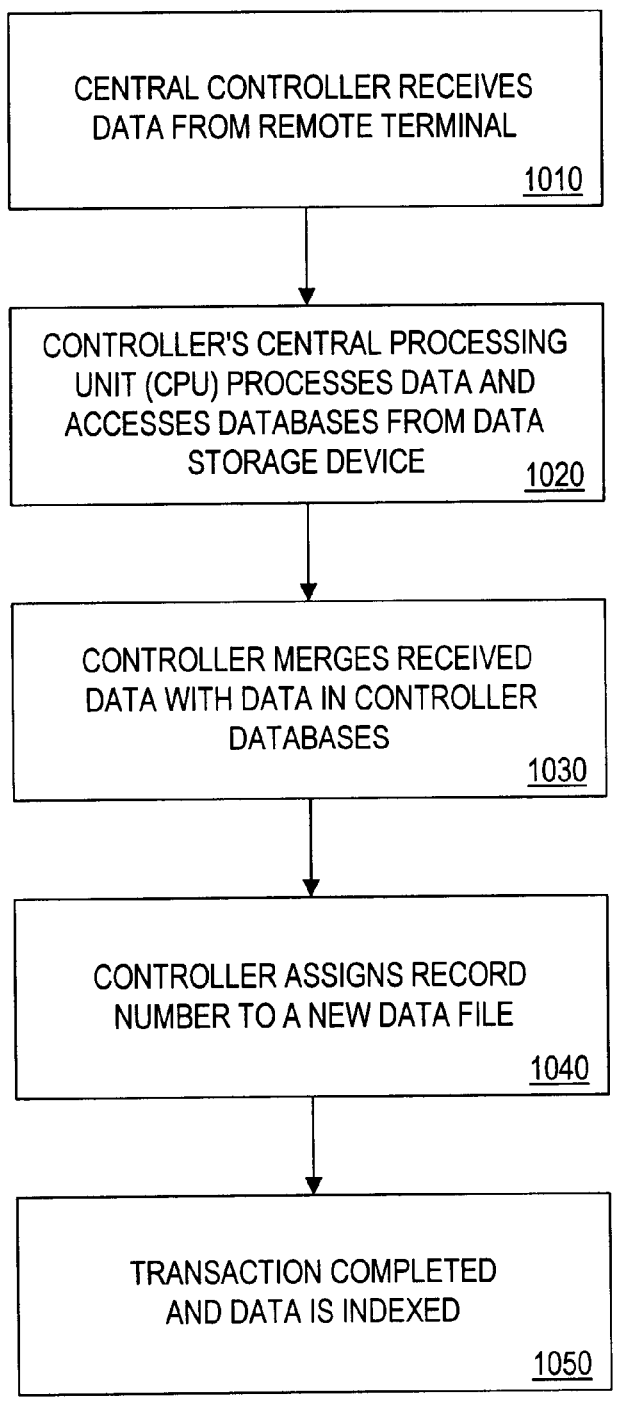
FIG. 10 is a flow diagram representing a method for processing data in central controller 110 of FIG. 2.

Once central controller 110 receives the transmitted data, controller 110 processes and indexes the data. FIG. 10 illustrates one way which controller 110 processes and indexes the data. As shown in FIG. 10, central controller 110 receives the data stored in program database 362 and product database 363 from remote terminal 150 (step 1010). CPU 210 processes the data and accesses the program and product databases 262 and 263 from data storage device 260 (step 1020). Next, controller 110 merges the program and product data received from remote terminal 150 into the respective program and product databases 262 and 263 (step 1030). Furthermore, controller 110 preferably merges program and product data from a plurality of remote terminals 150, each remote terminal 150 corresponding to a different entertainment program. Controller 110 then assigns a program record number to each new program data file received from each remote terminal 150 (step 1040). Once the transaction is completed, the product data is indexed by the program record number (step 1050).

Purchasing a Product

Figure 11A:
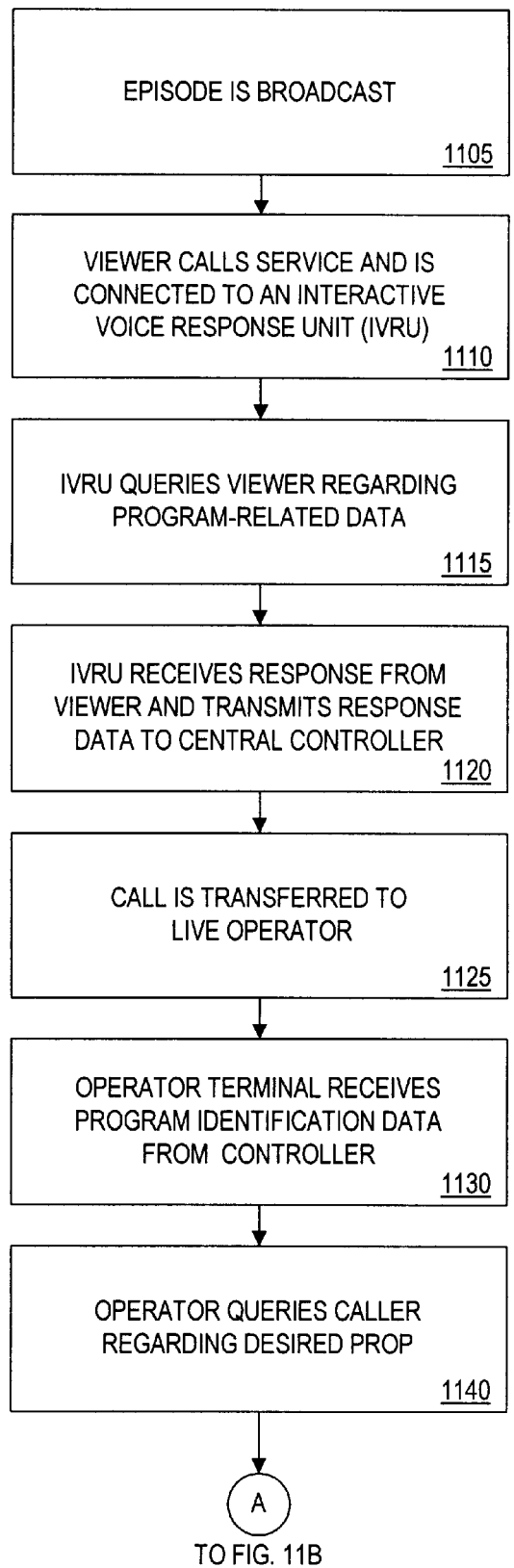
FIGS. 11a–11b are flow diagrams representing a method for processing a viewers' orders consistent with this invention.
Figure 11B:
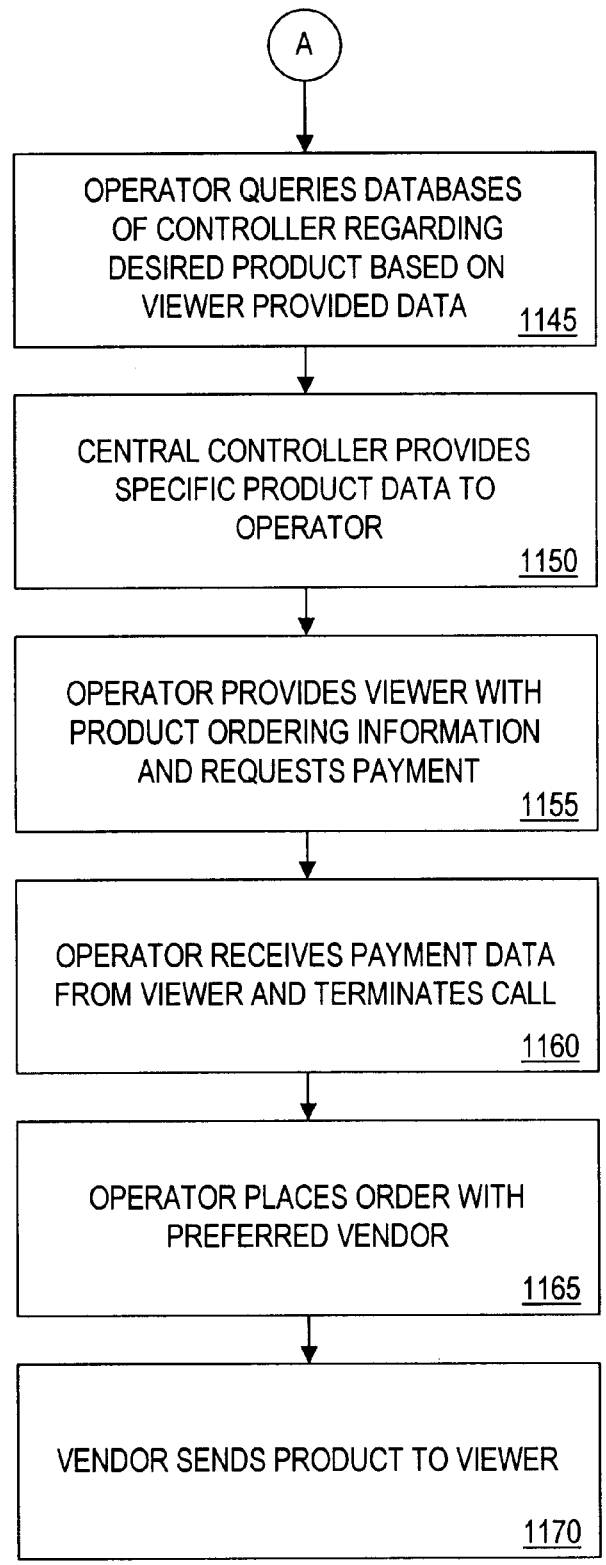

FIGS. 11a–11b illustrate the process in which system 100 allows a viewer to purchase a product used in a broadcasted entertainment program. An entertainment program is broadcast to a number of viewers using conventional broadcast techniques (step 1105), such as over-the-air television broadcasts and cable transmission. The program may also be played from a storage media, such as a video cassette or an optical laser disc, upon which the program is recorded or stored. If the program is played from a storage media, the program may include a statement telling the viewer the date after which products shown on the program will no longer be available for purchase. When a viewer wishes to purchase a product displayed in the program, he calls the service using viewer interface 120 and is connected to IVRU 130 (step 1110).

Various methods may be used to disseminate the telephone number of the service to the viewers. In one embodiment of the invention, the provider of the program adds a text overlay to the entertainment program to provide the viewer with the telephone number of the IVRU 130. The telephone number may be displayed either before the start of the entertainment program, at the end of the program, during a commercial; or during the program in a corner or along a side of the screen. The telephone number could also be made available in an entertainment program listing, such as TV GUIDE. The telephone number may be an 800 number, and the purchase price of a product is preferably charged to the viewer using either a credit card or personal check.

In a further embodiment of the invention, a 900 number is used as a communication and/or a payment interface for purchasing the desired product. In one such mode, the cost of the 900 number call is the cost of the requested product plus a connection charge. When a viewer/caller has confirmed an order using a standard IVRU interface or by talking to a live operator, the cost of the product is billed to his phone number. In another mode, the 900 number charges a service fee for the call plus a connection charge. Payment for the product is made in a conventional manner.

A time code may also be superimposed near the corner of the screen. The time code may be a running clock which is incremented as the program is broadcasted. In this embodiment, time code field 650 in Product Database 263 contains the values of the time code during which products were displayed on the program. By displaying the time code during the program broadcast, the viewer can identify products by the time code value indicated when the viewer noticed the product was shown.

IVRU 130 preferably includes a voice prompt system which asks the viewer a series of questions to identify the particular program the viewer is calling about, and the viewer responds by pressing the telephone keys (step 1115). For example, a viewer calling the service to order a suit an actor was wearing in a recent episode is queried by the IVRU 130 for the following information: network identification (CBS, NBC, TNT, FOX, ABC, ESPN, USA), time of day (AM, PM) and episode time (8:00pm), date of episode (March 4) and name of show (Seinfeld). IVRU 130 transmits the responses from the viewer interface 120 to central controller 110 (step 1120). Viewer interface 120's call is then transferred to a live operator (step 1125). Central Controller 110 then transmits program description data to operator terminal 140. In response, operator terminal 140 receives product identification data from controller 110 (step 1130). Based upon the information received from controller 110, the live operator asks the viewer further questions (perhaps even repeating the same questions as necessary) to determine which product the viewer would like to purchase (step 1140).

In an alternative embodiment, the viewer does not have to know the name of the program when describing the product to IVRU 130 or to the live operator. For example, the viewer could state "I don't know the name of the program, but a tall guy spilled coffee on something." The operator would then perform a keyword search on databases 262 and 263, using the description given by the viewer. In this way, the particular product may be identified without additional information from the viewer.

Continuing on FIG. 11b, the operator then accesses databases 262 and 263 to find data on the particular product that the viewer would like to purchase (step 1145). Central controller 110 then outputs the data on the particular product to the operator (step 1150). The operator, in turn, then provides product ordering information to viewer interface 120 and requests payment for the product (step 1155). Once the operator receives the viewer's payment, for example, a credit or debit card account number, the call is terminated (step 1160) and the order is placed with vendor facility 160 (step 1165). Vendor facility 160 then sends the purchased product to the viewer (step 1170). Alternatively, the service could simply forward the call to the vendor once the product has been identified and not process the order at all.

In an alternative embodiment, the present invention is practiced using an Internet interface to the service central controller 110. In this embodiment, a viewer connects to a service web page using conventional web browser software and enters show and product identifying information in response to programmed queries. A conventional search engine searches the appropriate databases, retrieves the episode and product information and displays a graphic presentation of the product. The viewer then visually identifies the product, and verifies electronically that the selection is correct. If the product selection was incorrect, the viewer is given the option to modify his search terms and submit a new query. Once the correct product is identified, the viewer purchases the product using conventional payment methods, and it is shipped to him. This embodiment has the advantage of not requiring human agents to process orders.

Conclusion

Systems and methods consistent with the invention significantly increase the financial revenue of an entertainment program by selling props or products used on the program. This added revenue may lessen the entertainment program's dependency on advertising, allowing greater freedom in the artistic content of the programs. Vendors may also be willing to pay more to have their products shown on an entertainment program due to the enhanced exposure associated with being on the program. To this end, systems consistent with the invention efficiently assemble program and product data into databases accessed by a central controller. Such data may be assembled, for example, for live broadcast entertainment programs, prerecorded (video tape) entertainment programs, or digital (laser disc) entertainment programs.

Systems and methods consistent with this invention also provide a simple, effective interface through which viewers may purchase products of an entertainment program without special codes or product numbers to identify the products. The viewer simply describes the entertainment program that he was viewing, the particular scene in which the product was used, or merchandise information to identify the particular product. Thus, there is no need for the viewer to know particular information about the product or prop itself. This provides added flexibility that will increase sales of those products by simplifying the ordering process. Accordingly, the present invention provides a system and method which efficiently sells products used on an entertainment program.

It will be apparent to those skilled in the art that various modifications and variations can be made to the system and method of the present invention without departing from the spirit or scope of the invention. The present invention covers the modifications and variations of this invention provided they come within the scope of the appended claims and their equivalents.

What is claimed is:

1. A system for allowing a viewer to purchase products shown in an entertainment program comprising:

means for storing in a database descriptive program information identifying a particular entertainment program in which a product was shown, and product information relating to a product shown in the particular entertainment program;

means for receiving a telephone call from the viewer, the telephone call comprising a request about the product shown in the entertainment program, the request containing a subset of the descriptive program information and a subset of the product information;

means for identifying the product information in the database using the subset of the product information and the subset of descriptive program information; and means for communicating to the viewer the identified information about the product.

2. The system according to claim 1, further comprising: means for placing an order with a vendor for the product.

3. The system according to claim 1, wherein the identifying means includes:

a central processing unit.

4. The system of claim 1, and further including:

means for identifying the particular entertainment program in the database using the subset of the descriptive program information.

5. The system of claim 1, wherein the descriptive program information includes:

information about characters and a plot of the entertainment program.

6. The system of claim 5, wherein the descriptive program information further includes:

information identifying a portion of the entertainment program in which the product is shown.

7. The system of claim 6, wherein the descriptive program information further includes:

a count value that corresponds to the time the product was shown in the entertainment program.

8. A method for allowing a viewer to purchase products shown in an entertainment program comprising the steps of:

storing descriptive program information identifying a particular entertainment program;

storing product information relating to a product shown in the particular entertainment program;

receiving from the viewer a request about the product shown in the particular entertainment program, the request containing a subset of the descriptive program information and a subset of the product information;

providing to a database the subset of product information through an operator terminal;

identifying the particular entertainment program using the subset of the descriptive program information;

identifying the stored product information using the subset of the product information; and communicating to the viewer the identified information about the product.

9. The method according to claim 8, further comprising the step of:

placing an order with a vendor for the product.

10. The method according to claim 8, wherein the step of identifying the particular entertainment program includes the step of:

performing a search using a database search engine.

11. The method according to claim 8, wherein the step of communicating further comprises the step of:

interactively providing to the viewer information about the product.

12. The method according to claim 8, and further including the step of:

receiving the descriptive product information from a viewer at a remote location.

13. The method of claim 8, wherein the descriptive program information includes:

information describing characters and a plot of the entertainment program.

14. The method of claim 13, wherein the descriptive program information further includes:

information identifying a portion of the entertainment program in which the product is shown.

15. The method of claim 14, wherein the descriptive program information further includes:

a count value that corresponds to the time the product was shown in the entertainment program.

16. An operator terminal for accessing information about a product corresponding to a prop used in an entertainment program, and for use with a central facility having a database and an interface unit to receive calls, the operator terminal comprising:

means for receiving a descriptive identification of an entertainment program;

means for receiving a request about a product shown in the entertainment program, comprising a telephone connection between the viewer and an operator at the operator terminal;

means for transmitting a query to the database relating to the request, the query based on the descriptive identification and the request about the product; and means for receiving from the database product information about the product identified in the request.

17. The operator terminal according to claim 16, further comprising:

means for conveying the received product information to the viewer.

18. An operator terminal for accessing information about a product corresponding to a prop used in an entertainment program, and for use with a central facility having a database and an interface unit to receive calls, the operator terminal comprising:

an interactive voice response unit including a voice prompt system means for receiving a descriptive identification of an entertainment program;

means for receiving a request about a product shown in the entertainment program;

means for transmitting a query to the database relating to the request, the query based on the descriptive identification and the request about the product; and means for receiving from the database product information about the product identified in the request.

19. A method for accessing, through an operator terminal located in a central facility, information about a product shown in an entertainment program, comprising the steps of:

receiving a descriptive identification of an entertainment program;

receiving from an entertainment program viewer a request about a product shown in the entertainment program through a telephone connection between the viewer and an operator at the operator terminal;

transmitting a query relating to the request, the query based on the descriptive identification and the request about the product; and receiving product information about the product identified in the request.

20. The method according to claim 19, further comprising the step of:

conveying the received product information to the viewer.

21. A method for accessing, through an operator terminal located in a central facility, information about a product shown in an entertainment program, comprising the steps of:

receiving a descriptive identification of an entertainment program;

receiving from an entertainment program viewer a request about a product shown in the entertainment program;

transmitting a query relating to the request, the query based on the descriptive identification and the request about the product; and receiving product information about the product identified in the request;

providing information about products shown in the entertainment program;

asking the viewer a series of questions to identify the particular entertainment program; and transmitting requests received from viewers to an operator at the operator terminal.

22. A system for allowing entertainment program viewers to purchase products shown in an entertainment program comprising:

a remote terminal for entering descriptive program data and product data about a product used in the entertainment program;

a central controller, coupled to the remote terminal, for receiving and storing the entered descriptive program data and product data from the remote terminal; and an operator terminal, coupled to the central controller, for using a subset of the descriptive program data to access from the central controller information about the product used in the entertainment program.

23. The system according to claim 22, wherein the remote terminal includes:

means for entering the descriptive program information and the product information, wherein the product information includes information identifying how the product was used in the program;

a local database storing the entered descriptive program information and product information; and means for transmitting to the central controller the descriptive progam information and the product information stored in the local database.

24. The system according to claim 22, wherein the central controller includes:

means for receiving from the operator terminal a request about the product shown in the entertainment program, the request containing a subset of the descriptive program information and the product information;

means for identifying the product information in the database using the subset of the descriptive program information and the product information; and means for sending to the operator terminal the identified information about the product.

25. The system according to claim 22, wherein the operator termianl includes:

an interface unit to receive calls;

means for receiving from the interface unit a request about a product shown in the entertainment program;

means for remotely transmitting a query to the central controller relating to the request; and means for receiving from the central controller product information about the product identified in the request.

26. The system of claim 1 wherein the means for receiving a telephone call includes:

means for automatically receiving first information communicated during said telephone call; and means for transferring said telephone call to a live operator after the receipt of said first information.

27. A system for allowing a viewer to purchase products shown in an entertainment program comprising:

means for storing in a database descriptive program information identifying a particular entertainment program in which a product was shown, and product information relating to a product shown in the particular entertainment program;

means for receiving from the viewer a request about the product shown in the entertainment program at a time different from the viewing of the entertainment program by the viewer, the request containing a subset of the descriptive program information and a subset of the product information;

means for identifying the product information in the database using the subset of the product information and the subset of descriptive program information; and means for communicating to the viewer the identified information about the product.

28. A method for allowing a viewer to purchase products shown in an entertainment program comprising the steps of:

storing descriptive program information identifying a particular entertainment program;

storing product information relating to a product shown in the particular entertainment program;

receiving from the viewer a telephone call including a request about the product shown in the particular entertainment program, the request containing a subset of the descriptive program information and a subset of the product information;

identifying the particular entertainment program using the subset of the descriptive program information;

identifying the stored product information using the subset of the product information; and communicating to the viewer the identified information about the product.

29. The system of claim 28 wherein the step of receiving a telephone call includes:

automatically receiving first information communicated during said telephone call; and transferring said telephone call to a live operator after the receipt of said first information.

30. The system of claim 1 wherein the receiving means includes means for receiving the request at a time different from the viewing of the entertainment program by the viewer.

31. The system according to claim 27, further comprising:

means for placing an order with a vendor for the product.

32. The system according to claim 27, wherein the identifying means includes:

a central processing unit.

33. The system of claim 27, and further including:

means for identifying the particular entertainment program in the database using the subset of the descriptive program information.

34. The system of claim 27, wherein the descriptive program information includes:

information about characters and a plot of the entertainment program.

35. The system of claim 34, wherein the descriptive program information further includes:

information identifying a portion of the entertainment program in which the product is shown.

36. The system of claim 35, wherein the descriptive program information further includes:

a count value that corresponds to the time the product was shown in the entertainment program.

37. The system of claim 27 wherein the means for receiving a telephone call includes:

means for automatically receiving first information communicated during said telephone call; and means for transferring said telephone call to a live operator after the receipt of said first information.

38. The system of claim 27 wherein the receiving means includes means for receiving the request at a time different from the viewing of the entertainment program by the viewer.

39. The system of claim 8, wherein the receiving step includes receiving a telephone call.

40. The system of claim 39 wherein the step of receiving a telephone call includes:

automatically receiving first information communicated during said telephone call; and transferring said telephone call to a live operator after the receipt of said first information.

41. The method according to claim 28, further comprising the step of:

placing an order with a vendor for the product.

42. The method according to claim 28, wherein the step of identifying the particular entertainment program includes the step of:

performing a search using a database search engine.

43. The method according to claim 28, and further including the step of:

providing to a database the subset of product information through an operator terminal.

44. The method according to claim 21, further comprising the step of:

conveying the received product information to the viewer.

45. The method according to claim 28, wherein the step of communicating further comprises the step of:

interactively providing to the viewer information about the product.

46. The method according to claim 28, and further including the step of:

receiving the descriptive product information from a viewer at a remote location.

47. The method of claim 28, wherein the descriptive program information includes:

information describing characters and a plot of the entertainment program.

48. The method of claim 47, wherein the descriptive program information further includes:

information identifying a portion of the entertainment program in which the product is shown.

49. The method of claim 48, wherein the descriptive program information further includes:

a count value that corresponds to the time the product was shown in the entertainment program.

50. The operator terminal according to claim 16, further comprising:

an interactive voice response unit including a voice prompt system.

51. The operator terminal according to claim 18, wherein the means for receiving the request includes:

a telephone connection between the viewer and an operator at the operator terminal.

52. The operator terminal according to claim 18, further comprising:

means for conveying the received product information to the viewer.

53. The method according to claim 19, further comprising the steps of:

providing information about products shown in the entertainment program;

asking the viewer a series of questions to identify the particular entertainment program; and transmitting requests received from viewers to an operator at the operator terminal.

54. The method according to claim 21, wherein the step of receiving a request includes the step of:

receiving a request through a telephone connection between the viewer and an operator at the operator terminal.

* * * * *